United States Patent [19]

Okamoto

[11] Patent Number: 5,386,573
[45] Date of Patent: Jan. 31, 1995

[54] SINGLE CHIP MICROCOMPUTER WITH INTERRUPT PROCESSING CAPABILITY DURING HOLD STATES

[75] Inventor: Wataru Okamoto, Tokyo, Japan

[73] Assignee: NEC Corporation, Tokyo, Japan

[21] Appl. No.: 64,573

[22] Filed: May 20, 1993

[30] Foreign Application Priority Data

May 20, 1992 [JP] Japan .................................. 4-152779

[51] Int. Cl.$^6$ ................................................ G06F 9/46
[52] U.S. Cl. .............................. 395/725; 364/DIG. 1; 364/DIG. 2; 364/241.2; 364/241.3; 364/242.3; 364/940; 364/940.1; 364/941; 364/94.1; 364/941.3
[58] Field of Search ................. 364/DIG. 1 MS Files, 364/DIG. 2 MS Files; 395/275, 375, 550, 650, 725, 775, 800

[56] References Cited

U.S. PATENT DOCUMENTS 4,498,136  2/1985  Sproul, III ........................... 395/725
5,261,107  11/1993  Klim et al. .......................... 395/200

Primary Examiner—Robert B. Harrell
Attorney, Agent, or Firm—Young & Thompson

[57] ABSTRACT

A novel single chip microcomputer comprises a bus, a random access memory connected to the bus, a read only memory, a peripheral interface, a central processing unit taking a hold state according to a hold request signal transmitted from an external device outside the microcomputer, an interrupt controller receiving an interrupt request signal and then delivering an interrupt process request signal to the central processing unit, and a control unit. The control means receives an interrupt request signal from an external device and then delivers both an interrupt process request signal and a hold release signal to the central processing unit to release the central processing unit from the hold state. Subsequently, the control means synchronizes with an interrupt acknowledge signal from the central processing unit and delivers a vectored interrupt through the bus to the central processing unit so that the central processing unit executes an interrupt servicing program until the control means receives an interrupt process complete signal from the central processing unit.

6 Claims, 5 Drawing Sheets

SINGLE CHIP MICROCOMPUTER WITH INTERRUPT PROCESSING CAPABILITY DURING HOLD STATES

BACKGROUND OF THE INVENTION

The invention relates to a single chip microcomputer, and more particularly to an improvement in a throughput of a single chip microcomputer.

Single chip microcomputers, in which a central processing unit (a CPU), storage devices or memory devices and peripheral interfaces are integrated on a single semiconductor chip, are attractive because of low cost of manufacturing and high reliability, in addition to low power consumption. Such single chip microcomputers are thus widely used in various fields. Simplification of fabrication processes of single chip microcomputers brings the cost down and improves the reliability. One of the most important factors in performances of microcomputers such as the single chip microcomputers is the throughput which is the total ability thereof to process data in a specified time period. How to improve the throughput of microcomputers as much as possible is thus very important. The effective throughput of the single chip microcomputer is associated with interrupt processes which force the central processing unit (CPU) to stop temporarily a current execution of a program for a subsequent execution of an urgent process. When an interrupt request signal is generated, a program in a current operation by the CPU is interrupted. A state of the program at the point at which the execution of the program is interrupted is saved before subsequent execution of the interrupt servicing program, after the execution of which the original program is returned so that the original program's operation will be reinitiated at the point at which it was interrupted.

There exists a single chip microcomputer having a direct memory access feature in which a data transfer between memories and external devices is conducted independently from the CPU operation. Namely, blocked data are transferred between memories and external devices without passing through the CPU so that a high speed data transfer is implemented. Such data transfer is controlled by a direct memory access controller which forces the CPU to take on a hold state so the controller may take exclusive control of a system bus in order to conduct the direct access memory transfer.

In the conventional single chip microcomputers, when a hold request signal is generated during an execution by CPU of a program fetched from a read only memory (a ROM) in the single chip microcomputer, the current program operation by the CPU is continued. In contrast, if a hold request signal is also generated during an execution by the CPU of a program fetched from an external storage device outside the chip, the current program operation by the CPU is interrupted. Since the interrupt request signal for urgent processing is generated during such hold state of the CPU, it is impossible to allow the CPU to execute the interrupt servicing program until the hold state of the CPU is released. It is no doubt apparent that such impossibility of interrupt servicing program's operation provides a restriction to the throughput of the single chip microcomputer. The above matters will be described more closely and concretely with reference to FIG. 1 which is illustrative of a hardware construction of a typical one of the conventional single chip microcomputers.

Figure 1:
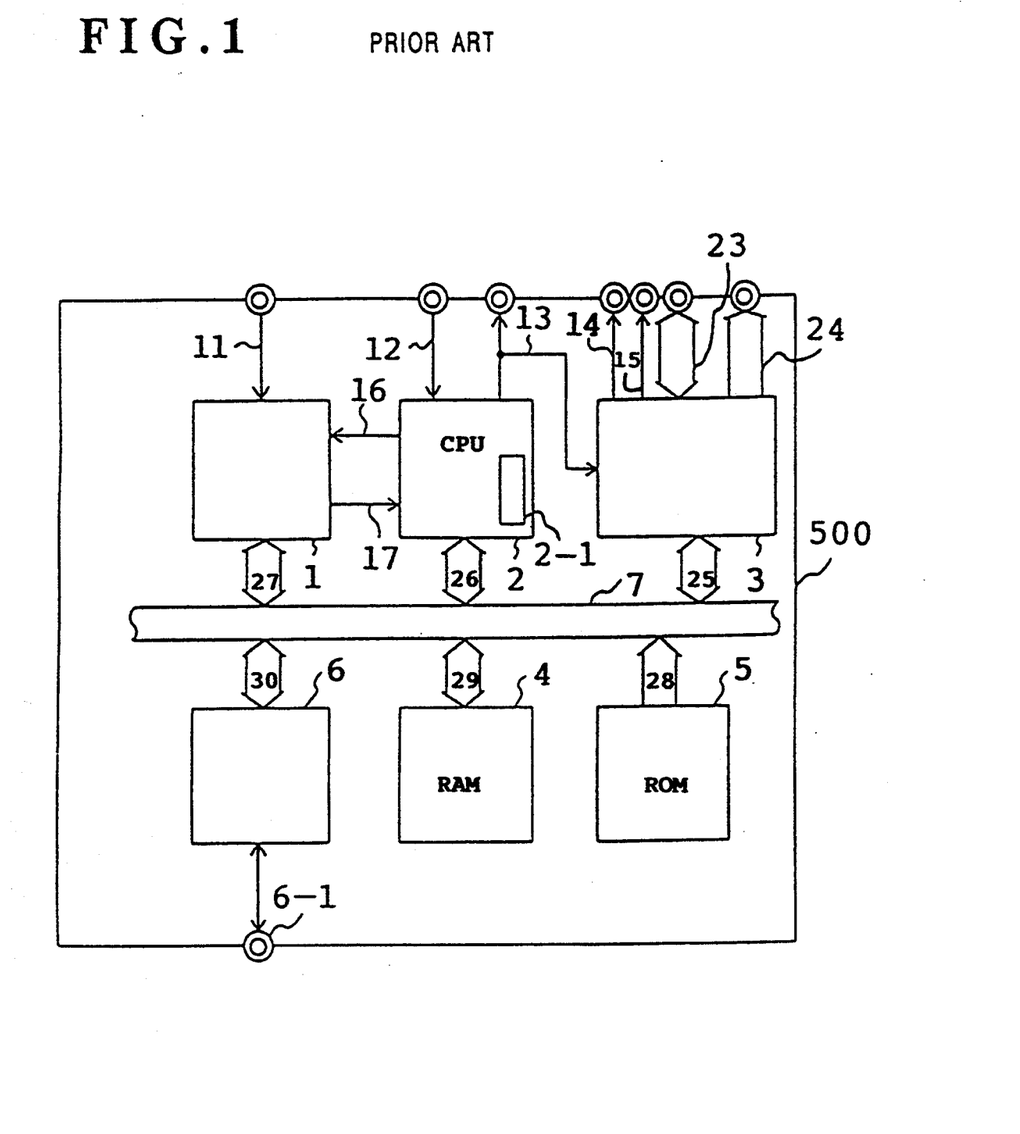
FIG. 1 is a block diagram illustrative of the conventional single chip microcomputer.

In FIG. 1, the single chip microcomputer 500 includes an interrupt controller 1, a central processing unit (a CPU) 2, an external interface 3, a random access memory (a RAM) 4, a read only memory (a ROM) 5, a peripheral device 6 and an internal bus 7. The interrupt controller 1 is connected through a bidirectional internal bus 27 to the internal bus 7. The central processing unit (CPU) 2 is also connected through a bidirectional internal bus 26 to the internal bus 7. The external interface 3, the random access memory (RAM) 4, and the peripheral device 6 are respectively connected through bidirectional internal buses 25, 29 and 30 to the internal bus 7. The read only memory (ROM) 5 is also connected to the internal bus 2 but through an unidirectional internal bus 28.

The interrupt controller 1 is connected to an interrupt request signal line 11. The central processing unit (CPU) 2 has an address register (2-1) which stores address of orders to fetch. The central processing unit (CPU) 2 is connected to a hold request signal line 12. The interrupt controller 1 and the central processing unit (CPU) 2 are connected to each other through both an interrupt acknowledge signal line 16 and an interrupt request signal line 17. The central processing unit (CPU) 2 is also connected to a hold acknowledge signal line 13 connecting to both an external device and the external interface 3. The external interface 3 is connected to a read strobe signal line 14, a write strobe signal line 15, an internal data bus 23 and an internal address bus 24. The internal data bus 23 is a bidirectional interface bus, but the internal address bus 24 is but a unidirectional interface bus. The internal address bus 24 transmits addresses from the external interface 3 to an external memory device for access to the external memory device, in which the address has been supplied from the internal bus 7 through the internal bus 25 to the external interface 3. The internal data bus 23 transmits data from the external interface 3 to the external memory device for access to the external memory device, in which the data has been supplied from the internal bus 7 through the internal bus 25 to the external interface 3. The random access memory 4 is a storage device from which data is read from or written to. The read only memory (ROM) 5 is a storage device which permanently stores user programs and fixed data. The central processing unit (CPU) 2 executes operations of programs stored in the read only memory (ROM) 5 or in a storage device. The peripheral device 6 may comprise a port which communicates with external devices through an external terminal 6-1. The peripheral device 6 receives data transmitted through the external terminal 6-1 from the external device, and then supplies the data to the internal bus 7 through the bus 30. The internal bus 7 is an interface bus which conducts a time division transmission of address and data.

The operation of the conventional single chip microcomputer 500 will subsequently be described. When a hold request is generated in the external device, a hold request signal S12 takes a 1 state. The hold request signal S12 is transmitted on the hold request signal line 12 to the central processing unit (CPU) 2. The central processing unit (CPU) 2 receives the hold request signal S12 and then generates and delivers a hold acknowledge signal S13 which is transmitted on the hold acknowledge signal line 13 to both the external device and the external interface 3. The central processing unit (CPU) 2 takes the following different two states according to the address stored in the address register in the central processing unit (CPU) 2, and thus depending upon what the central processing unit (CPU) 2 specifies as objects of its operation according to values stored in the address register 2-1.

A first case is that according to the value stored in the address register 2-1 the central processing unit 2 specifies the read only memory (ROM) 5 for a subsequent program operation or data processing. As described above, the central processing unit (CPU) 2 receives the hold request signal S12 transmitted on the hold request signal line 12, and then generates and delivers the hold acknowledge signal S13 to both the external device and the external interface 3 through the hold acknowledge signal line 13. The central processing unit (CPU) 2 subsequently continues the current operation of data processing. Namely, in this case, the central processing unit (CPU) 2 does not takes any hold state. In addition, the external interface 3 receives the hold acknowledge signal S13 transmitted from the central processing unit (CPU) 2 and then makes all of its outputs take on high impedance states. Namely, at this time, the read strobe signal line 14, the write strobe signal line 15, the address bus 23 and the data bus 24 take the high impedance state, resulting in no output of a read strobe signal S14 on the read nor output of a write strobe signal S15 on the write strobe signal line 15, in addition to no output of a data signal on the data bus 23 nor an input of an address signal S24 on the address bus 24. In the meantime of the above process, there is a possibility of a generation of an interrupt request outside the microcomputer chip. When an interrupt request signal S11 is generated, the interrupt request signal line 11 to the interrupt controller 1. The interrupt controller 11 receives the interrupt request signal S11, and then generates and delivers an interrupt request signal S17 which is transmitted though the interrupt request signal line 17 to the central processing unit (CPU) 2. After that, the central processing unit (CPU) 2 receives the interrupt request signal 17 and thus delivers an interrupt acknowledge signal S16 back to the interrupt controller 1 through the interrupt acknowledge signal line 16. The interrupt controller 1 synchronizes with the interrupt acknowledge signal S16 and generates a vectored interrupt which is subsequently transmitted through the bus 27 to the bus 7. The internal bus 7 transmits the vectored interrupt through the bus 26 to the central processing unit (CPU) 2. The central processing unit (CPU) 2 receives the vectored interrupt and then executes an interrupt program according to the vectored interrupt. After than, the data processing or the program operation by the central processing unit (CPU) 2 continues at the point at which the data processing or the program operation was interrupted.

Subsequently, when the hold request signal S12 takes a 0 state and thus the hold request is released, the central processing unit (CPU) 2 continues executing the current program operation or the current data processing. The high impedance state of the external interface 3 is released. The hold acknowledge signal S13 takes a 0 state.

From the above description, in the first case in which the central processing unit (CPU) 2 processes the data or the program fetched from the read only memory (ROM) 5, there is no problem with a lowering of the throughput of the microcomputer 500.

Such problem with lowering the throughput of the single chip microcomputer 500, however, appears in the second case in which the central processing unit (CPU) 2 processes data or a program which has been stored in an external storage device. The problem will be cleared by describing the operation of the microcomputer 500 in the second case, also with reference to FIG. 1.

The central processing unit specifies an external storage device according to the address stored in the address register 2-1, and subsequently fetches data or programs stored in the external storage device for an execution of data processing or program operation. The central processing unit (CPU) 2 receives the hold request signal S12 transmitted on the hold request signal line 12, and then generates and delivers the hold acknowledge signal S13 to both the external device and the external interface 3 through the hold acknowledge signal line 13. The central processing unit (CPU) 2 subsequently stops or interrupts the current program operation or data processing. Namely, in this case, the central processing unit (CPU) 2 takes a hold state and thus is not operational. Hence, any order or request is not acceptable to the central processing unit 2 taking the hold state. In addition, the external interface 3 receives the hold acknowledge signal S13 transmitted from the central processing unit (CPU) 2 and then makes its all outputs take on high impedance states. In the meantime of the above process, there is a possibility of a generation of an interrupt request outside the microcomputer chip. When an interrupt request signal S11 is generated, the interrupt request signal S11 is transmitted through the interrupt request signal line 11 to the interrupt controller 1. The interrupt controller 1 receives the interrupt request signal S11, and then generates and delivers an interrupt request signal S17 which is subsequently transmitted through the interrupt request signal line 17 to the central processing unit (CPU) 2 taking the hold state or being not operational. The central processing unit (CPU) 2 at such the state is unable to receive or accept the interrupt request signal 17. Namely, the interrupt request is rejected by the central processing unit (CPU) 2, because it has taken on the hold state, resulting in no execution of the interrupt processing, even if the interrupt request is urgent and prompt interrupt processing is very important. That is why the interrupt processing is forced to wait until the central processing unit (CPU) 2 is released from the hold state.

When the hold request signal S12 takes a 0 state and thus the hold request is released, the central processing unit (CPU) 2 is released from the hold state. So the central processing unit (CPU) 2 becomes operational and thus being able to receive or accept the interrupt request signal S17, and then delivers an interrupt acknowledge signal S16 back to the interrupt controller 1 through the interrupt acknowledge signal line 16. The interrupt controller 1 synchronizes with the interrupt acknowledge signal S16 and generates a vectored interrupt which is subsequently transmitted through the bus 27 to the bus 7. The internal bus 7 transmits the vectored interrupt through the bus 26 to the central processing unit (CPU) 2. The central processing unit (CPU) 2 receives the vectored interrupt and then executes an interrupt process according to the vectored interrupt. After processing the interrupt routine, the central processing unit (CPU) 2 continues executing the program operation or the data processing at the point at which it was interrupted by appearance of the hold request.

From the above descriptions, in the second case that the central processing unit (CPU) 2 processes the data or the program fetched from an external storage device, there is the problem of a lowering of the throughput of the microcomputer 500, because the interrupt process is forced to wait until the hold state of the central processing unit (CPU) 2 is released.

As the performance speed of central processing units is improved, the disadvantage caused by many interrupt requests that are unable to be processed by the central processing unit at the hold state is considerable. It seems that in the case of using a direct memory access transfer, the time during which the central processing unit takes on the hold state is approximately several hundreds microseconds. If it were possible for the central processing unit to execute interrupt processing during a hold state continuing for so long time, several hundreds of interrupt requests would be expected to be processed.

It is therefore desirable to develop a novel microcomputer which allows a central processing unit to execute interrupt processes not only when the central processing unit does not take a hold state but also when the central processing unit takes the hold state to improve the throughput of the microcomputer.

SUMMARY OF THE INVENTION

Accordingly, it is a primary object of the present invention to provide a novel microcomputer.

It is a further object of the present invention to provide a novel single chip microcomputer having an improved throughput thereof.

It is a further object of the present invention to provide a novel single chip microcomputer allowing a central processing unit to execute interrupt processes not only when the central processing unit does not take a hold state but also the central processing unit does take the hold state.

The above and other objects, features and advantages of the present invention will be apparent from the following descriptions.

SUMMARY OF THE INVENTION

The invention provides a novel single chip microcomputer including an internal communication bus, a random access memory, a read only memory, a peripheral interface, a central processing unit taking a hold state according to a hold request signal transmitted from an external device outside the microcomputer, an interrupt controller receiving an interrupt request signal and then delivering an interrupt process request signal to the central processing unit, and a control unit. The control unit receives an interrupt request signal transmitted from an external device outside the microcomputer and then delivers both an interrupt process request signal and a hold release signal to the central processing unit for having the central processing unit released from the hold state and subsequently the control unit synchronizes with an interrupt acknowledge signal from the central processing unit and delivers a vectored interrupt through the internal communication bus to the central processing unit so that the central processing unit executes an interrupt servicing program until the control unit receives an interrupt complete signal transmitted from the central processing unit.

BRIEF DESCRIPTION OF THE DRAWINGS

Preferred embodiments of the present invention will hereinafter fully be described in detail with reference to the accompanying drawings.

PREFERRED EMBODIMENTS OF THE INVENTION

The invention provides a novel single chip microcomputer including a control unit allowing a central processing unit to execute interrupt processes not only when the central processing unit does not take a hold state but also when the central processing unit takes the hold state.

A first embodiment according to the present invention will be described in detail with reference to FIGS. 2A and 2B.

Figure 2A:
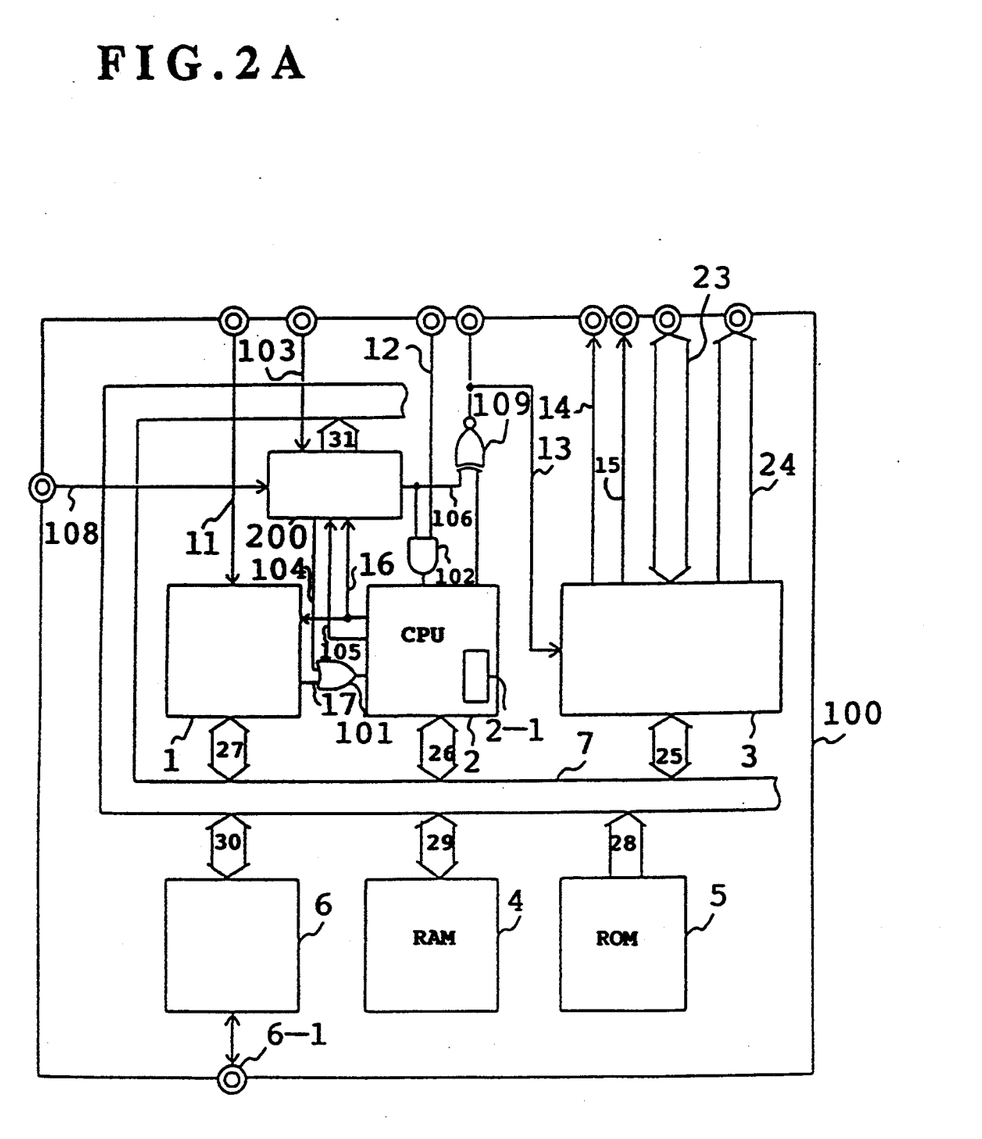
FIG. 2A is a block diagram illustrative of a novel single chip microcomputer of a first embodiment according to the present invention.
Figure 2B:
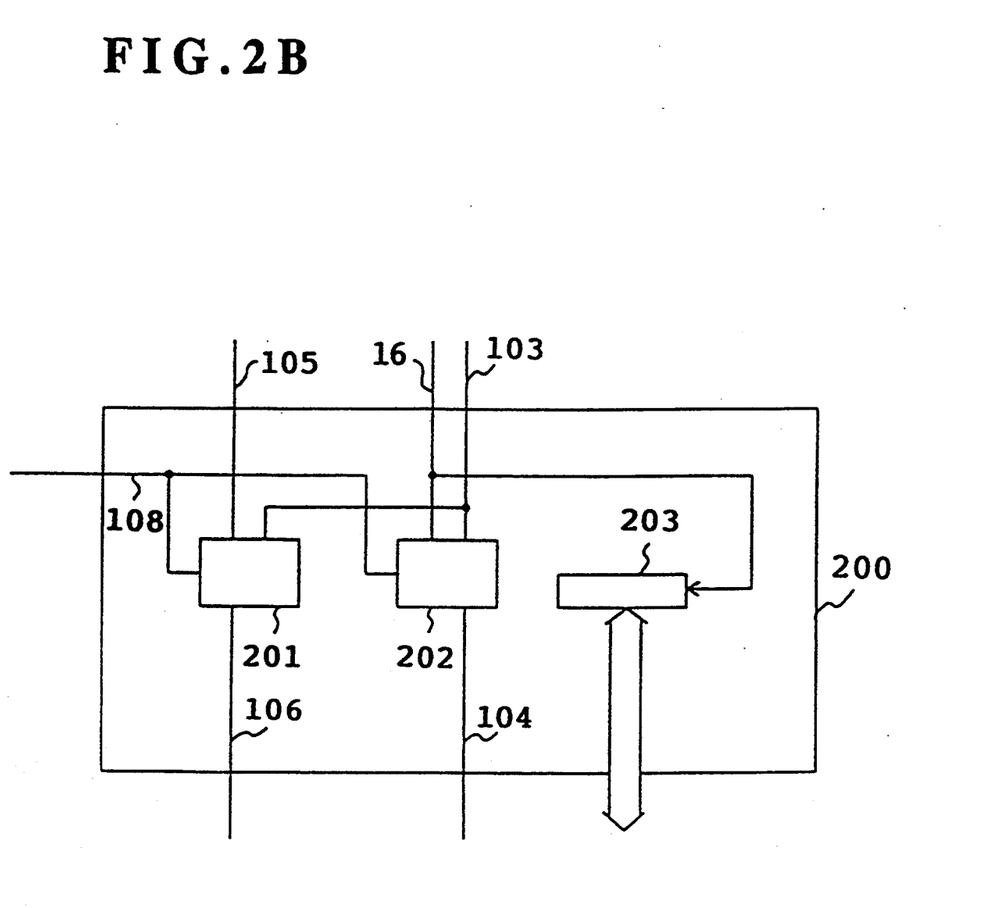
FIG. 2B is a block diagram illustrative of a control unit of the novel single chip microcomputer illustrated in FIG. 2A.

In FIG. 2A, a novel single chip microcomputer 100 includes an interrupt controller 1, a central processing unit (a CPU) 2, an external interface 3, a random access memory (a RAM) 4, a read only memory (a ROM) 5, a peripheral device 6, an internal bus 7 and a control unit 200. The interrupt controller 1 is connected through a bidirectional internal bus 27 to the internal bus 7. The central processing unit (CPU) 2 is also connected through a bidirectional internal bus 26 to the internal bus 7. The external interface 3, the random access memory (RAM) 4, and the peripheral device 6 are respectively connected through bidirectional internal buses 25, 29 and 30 to the internal bus 7. The read only memory (ROM) 5 is also connected to the internal bus 7 but through a unidirectional internal bus 28. The control unit 200 is connected through an internal bus 31 to the internal bus 7.

The interrupt controller 1 is connected to an interrupt request signal line 11 for receipt of an interrupt request signal S11 which was transmitted from an external device outside the microcomputer chip 100. The central processing unit (CPU) 2 has an address register (2-1) which stores addresses specifying storage devices from which the central processing unit 2 fetches data or a program. The central processing unit (CPU) 2 is connected to a hold request signal line 12 though an AND gate 102 for receipt of a hold request signal S12 which is transmitted from an external device outside the microcomputer chip 100. The interrupt controller 1 and the central processing unit (CPU) 2 are connected to each other through both an interrupt acknowledge signal line 16 and an interrupt request signal line 17 on which an OR gate is arranged. The interrupt controller 1 delivers an interrupt request signal S17 which is transmitted on the interrupt request signal line 17 through the OR gate 101 to the central processing unit 2. The central processing unit 2 returns an interrupt acknowledge signal S16 to the interrupt controller 1 through the interrupt acknowledge signal line 16. The central processing unit (CPU) 2 is also connected to a hold acknowledge signal line 13 on which an EXNOR gate 109 is arranged. The hold acknowledge signal line 13 connects to both an external device and the external interface 3.

The external interface 3 is connected to a read strobe signal line 14 for delivering a READ strobe signal S14 to an external device outside the microcomputer chip 100. The external interface 3 is also connected to a write strobe signal line 15 for delivering a WRITE strobe signal S14 to an external device outside the microcomputer chip 100. The external interface 3 is also connected to both an internal data bus 23 which transmits data and an internal address bus 24 which transmits addresses between the external interface 3 and an external device outside the microcomputer chip 100. The internal data bus 23 is a bidirectional interface bus and the internal address bus 24 is a unidirectional interface bus.

The random access memory 4 is a storage device that data is either read from or written to. The read only memory (ROM) 5 is a storage device which permanently store user programs and fixed data. The central processing unit (CPU) 2 executes operations of programs stored in the read only memory (ROM) 5 or in an external storage device. The peripheral device 6 may comprise a port which communicates with external devices through an external terminal 6-1. The peripheral device 6 receives data transmitted through the external terminal 6-1 from the external device, and then supplies the data to the internal bus 7 through the bus 30, The internal bus 7 is an interface bus which conducts a time division transmission of address and data.

The control unit 200 is connected to a reset signal line 108 for receipt of a RESET signal S108 from an external device. The control unit 200 is also connected to an interrupt request signal line 103 for receipt of an interrupt request signal S103. The control unit 200 is also connected to an interrupt process complete signal line 105 which connects with the central processing unit 2 for receipt of an interrupt process complete signal S105 from the central processing unit 2. The control unit 200 is also connected to the interrupt acknowledge signal line 16 which connects with the central processing unit 2 for receipt of an interrupt acknowledge signal S16 from the central processing unit 2. The control unit 200 is further connected to an interrupt process signal line 104, on which the OR gate 101 exists, which connects with the central processing unit 2 for delivering an interrupt process signal S104 to the central processing unit 2 through the OR gate 101. The control unit 200 is furthermore connected to a hold release signal line 106 which transmits a hold release signal S106 to both the central processing unit 2 through the AND gate 102 and the external interface 3 through the EXNOR gate 109.

The circuit structure of the control unit 200 of the novel single chip microcomputer 100 will subsequently be described with reference to FIG. 2B. The control unit 200 includes first and second latch circuits 201 and 202 and a vector generation circuit 203. The first latch circuit 201 is connected to the interrupt process complete signal line 105 for receipt of the interrupt process complete signal S105 from the central processing unit 2. The first latch circuit 201 is also connected to the hold release signal line 106 for delivering the hold release signal S106 to the central processing unit 2 through the AND gate 102. The first and second latch circuits 201 and 202 are respectively connected to the reset signal line 108 for receipt of the RESET signal from the external device. The first and second latch circuits 201 and 202 are also connected respectively to the interrupt request signal line 103 for receipt of the interrupt request signal S103. The second latch circuit 202 is further connected to the interrupt process signal line 104 for delivering the interrupt process signal S104 to the central processing unit 2 through the OR gate 101. The second latch circuit 202 and the vector generation circuit 203 are connected to the interrupt acknowledge signal line 16 for receipt of the interrupt acknowledge signal S16 from the central processing unit 2. The vector generation circuit 203 is connected through the bus 31 to the bus 7.

When the first latch circuit 201 receives a 1 signal of the interrupt request signal S103, a 1 level is held and a 0 signal of the hold release signal S106 appears as an output on the hold release signal line 106. When the first latch circuit 201 receives a 1 signal of the interrupt process complete signal S105, a 1 signal of the hold release signal, S106 appears as an output on the hold release signal line 106. When the first latch circuit 201 receives a 1 signal of the reset signal S108, a 0 level is held.

When the interrupt request signal S103 is a 1 level, the second latch circuit 202 holds a 1 level and then outputs a 1 signal as the interrupt request signal S104. When the interrupt acknowledge signal 16 from the central processing unit 2 is a 1 level, the second latch circuit 202 outputs a 0 level of the interrupt process signal S104 after reset thereof. When the RESET signal S108 is a 1 level, a 1 level is held.

The vector generation circuit 203 synchronizes with receipt of the interrupt acknowledge signal S16 and delivers a fixed vectored interrupt to the internal bus 7 through the bus 31.

The operation of the novel single chip microcomputer 100 will subsequently be described. The control unit 200 receives the RESET signal S108 and is reset. When a hold request is generated in an external device such as a direct memory access controller, the hold request signal S12 takes a 1 level. Since at this time the interrupt request has not been generated yet, the interrupt request signal S103 is a 0 level. The first latch circuit 201 involved in the controller unit 200 receives the 0 level interrupt request signal S103 and then delivers a 1 level of the hold release signal S106 to the central processing unit 2. The AND gate 102 receives both the 1 level hold request signal S12 and the 1 level hold release signal S106 and then outputs a 1 level signal which is transmitted to the central processing unit 2. The central processing unit 2 takes a hold state. The central processing unit 2 delivers a 0 level of a hold state signal to the EXNOR gate 109. The EXNOR gate 109 receives both the 0 level hold state signal and the 1 level hold release signal S106 and then outputs a 1 level signal which is transmitted to the external interface 3 thereby each of the address bus 24, the data bus 23, the read strobe signal line 14 and the write strobe signal line 15 takes a high impedance state.

During the above hold state of the central processing unit 2, an interrupt request is generated and thus a 1 level signal of the interrupt request signal S103 appears on the interrupt request signal line 103. The first latch circuit 201 receives the 1 level signal of the interrupt request signal S103 and holds a 1 level, and then the first latch circuit 201 outputs a 0 level signal of the hold release signal S106. The AND gate 102 receives both the 1 level hold request signal S12 and the 0 level of hold release signal S106 and then outputs a 0 level signal to the central processing unit 2. The central processing unit 2 is released from the hold state and becomes operational so as to enable it to receive every instruction or request signals. The central processing unit 2 delivers a 0 level of the hold state signal. The EXNOR gate 109 receives the 0 level hold state signal and the 0 level hold release signal S106 and then outputs a 1 level signal which is subsequently transmitted to the external interface 3. Thus, each of the address bus the data bus 23, the read strobe signal line 14 and the write strobe signal line 15 remains at a high impedance state.

The second latch circuit 202 receives the 1 level signal of the interrupt request signal S103 and holds a 1 level, and then the second latch circuit 202 outputs a 1 level signal of the interrupt process signal S104 which is transmitted to the OR gate 101, resulting in a 1 level signal outputted from the OR gate 101. The central processing unit 2 receives a 1 level interrupt request signal 17 and then delivers a 1 level interrupt acknowledge signal S16 back to the control unit 200 and the interrupt controller 1. The vector generation circuit 203 involved in the control unit 200 synchronizes with the level interrupt acknowledge signal S16 and generates a vectored interrupt which is subsequently delivered through the bus 31 to the internal bus 7, and further transmitted through the internal bus 7 to the central processing unit 2. The central processing unit 2 fetches the vectored interrupt and subsequently executes the operation of the interrupt servicing program.

The central processing unit 2 accords a return instruction from the interrupt servicing program at the end of the interrupt servicing program. At that time, the central processing unit 2 delivers the interrupt process complete signal S105 to the control unit 200. The control unit 200 receives the interrupt process complete signal S105 and then delivers a 1 level of the hold release signal. Since the hold request still remains and thus the 1 level signal still appears on the hold request signal line 12, the AND gate 102 outputs the 1 level signal which is subsequently fetched by the central processing unit 2 thereby the central processing unit 2 takes the hold state again.

When the hold request is eliminated, the hold request signal S12 becomes a 0 level. The AND gate 102 outputs a 0 level signal which is subsequently fetched by the central processing unit 2, resulting in that the central processing unit 2 is released from the hold state.

From the above descriptions, it is understood that the control unit 200 allows the central processing unit 2 to execute the interrupt servicing program operation, even when the central processing unit 2 has taken the hold state when the interrupt request was generated. The novel single chip microcomputer 100 allows a considerable improvement in the throughput thereof, particularly as the central processing unit 2 has a high speed process function.

A second embodiment of the present invention will be described in detail with reference to FIGS. 3A and 3B.

Figure 3A:
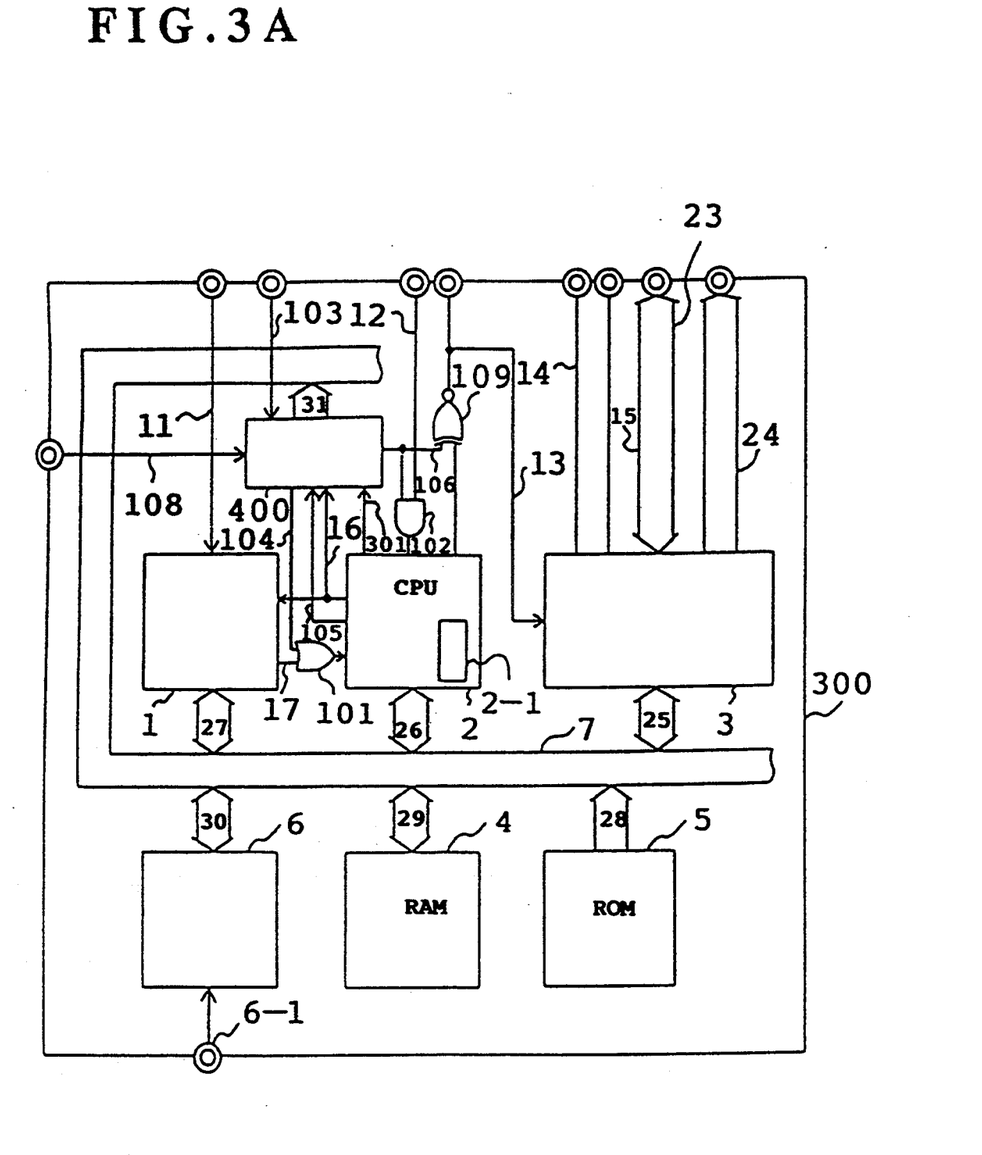
FIG. 3A is a block diagram illustrative of a novel single chip microcomputer of a second embodiment according to the present invention.
Figure 3B:
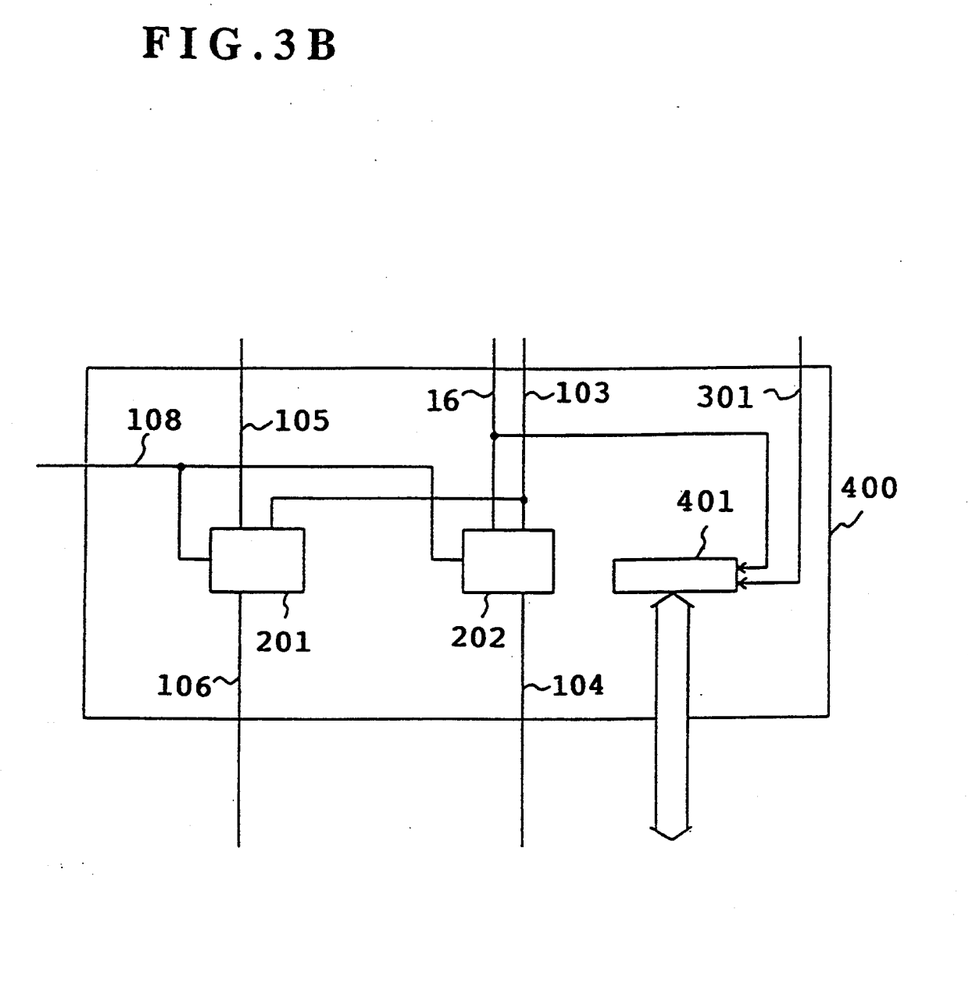
FIG. 3B is a block diagram illustrative of a control unit of the novel single chip microcomputer illustrated in FIG. 3A.

In FIG. 3A, a novel single chip microcomputer 300 of the second embodiment according to the present invention has a circuit structure analogous to that of the first embodiment, except that a control unit receives a WRITE signal from a central processing unit. The control unit synchronizes with the WRITE signal and stores vector informations supplied from the central processing unit through an internal bus. The vector stored in the control unit specifies an interrupt having the highest priority.

The novel single chip microcomputer 300 includes an interrupt controller 1, a central processing unit (a CPU) 2, an external interface 3, a random access memory (a RAM) 4, a read only memory (a ROM) 5, a peripheral device 6, an internal bus 7 and a control unit 400. The interrupt controller 1 is connected through a bidirectional internal bus 27 to the internal bus 7. The central processing unit (CPU) 2 is also connected through a bidirectional internal bus 26 to the internal bus 7. The external interface 3, the random access memory (RAM) 4, and the peripheral device are respectively connected through bidirectional internal buses 25, 29 and 30 to the internal bus 7. The read only memory (ROM) 5 is also connected to the internal bus 7 but through a unidirectional internal bus 28. The control unit 400 is connected through an internal bus 31 to the internal bus 7.

The interrupt controller 1 is connected to an interrupt request signal line 11 for receipt of an interrupt request signal S11 which was generated from an external device outside the microcomputer chip 300. The central processing unit (CPU) 2 has an address register (2-1) which stores address specifying a storage device from which the central processing unit 2 fetches program or data. The central processing unit (CPU) 2 is connected to a hold request signal line 12 though an AND gate 102 for receipt of a hold request signal S12 which is transmitted from an external device outside the microcomputer chip 300. The interrupt controller 1 and the central processing unit (CPU) 2 are connected to each other through both an interrupt acknowledge signal line 16 and an interrupt request signal line 17 on which an OR gate is arranged. The interrupt controller 1 delivers an interrupt request signal S17 which is transmitted on the interrupt request signal line 17 through the OR gate 101 to the central processing unit 2. The central processing unit 2 returns an interrupt acknowledge signal S16 to the interrupt controller 1 through the interrupt acknowledge signal line 16. The central processing unit (CPU) 2 is also connected to a hold acknowledge signal line 13 on which an EXNOR gate 109 is arranged. The hold acknowledge signal line 13 connects to both an external device and the external interface 3.

The external interface 3 is connected to a read strobe signal line 14 for delivering a READ strobe signal S14 to an external device outside the microcomputer chip 300. The external interface 3 is also connected to a write strobe signal line 15 for delivering a WRITE strobe signal S14 to an external device outside the microcomputer chip 300. The external interface 3 is also connected to both an internal data bus 23 which transmits data and an internal address bus 24 which transmits address between the external interface 3 and an external device outside the microcomputer chip 300. The internal data bus 23 is a bidirectional interface bus and the internal address bus 24 is but a unidirectional interface bus.

The random access memory 4 is a storage device from which data is read or written to. The read only memory (ROM) 5 is a storage device which permanently store user's programs and fixed data. The central processing unit (CPU) 2 executes operations of programs stored in the read only memory (ROM) 5 or in an external storage device. The peripheral device 6 may comprise a port which communicates with external devices through an external terminal 6-1. The peripheral device 6 receives data transmitted through the external terminal 6-1 from the external device, and then supplies the data to the internal bus 7 through the bus 30. The internal bus 7 is an interface bus which conducts a time division transmission of address and data.

The control unit 400 is connected to a reset signal line 108 for receipt of a RESET signal S108 from an external device. The control unit 400 is also connected to an interrupt request signal line 103 for receipt of an interrupt request signal S103. The control unit 400 is also connected to an interrupt process complete signal line 105 which connects with the central processing unit 2 for receipt of an interrupt process complete signal S105 from the central processing unit 2. The control unit 400 is also connected to the interrupt acknowledge signal line 16 which connects with the central processing unit 2 for receipt of an interrupt acknowledge signal S16 from the central processing unit 2. The control unit 400 is connected to a write signal line 301 which connects with the central processing unit 2 for receipt of a WRITE signal S301 from the central processing unit 2. The control unit 400 is further connected to an interrupt process signal line 104, on which the OR gate 101 is arranged, which connects with the central processing unit 2 for delivering an interrupt process signal S104 to the central processing unit 2 through the OR gate 101. The control unit 400 is furthermore connected to a hold release signal line 106 which transmits a hold release signal S106 to both the central processing unit 2 through the AND gate 102 and the external interface 3 through the EXNOR gate 109.

The circuit structure of the control unit 400 of the novel single chip microcomputer 300 will subsequently be described with reference to FIG. 3B. The control unit 400 includes first and second latch circuits 201 and 202 and a vector generation circuit 401. The first latch circuit 201 is connected to the interrupt process complete signal line 105 for receipt of the interrupt process complete signal S105 from the central processing unit 2. The first latch circuit 201 is also connected to the hold release signal line 106 for delivering the hold release signal S106 to the central processing unit 2 through the AND gate 102. The first and second latch circuits 201 and 202 are respectively connected to the reset signal line 108 for receipt of the RESET signal from the external device. The first and second latch circuits 201 and 202 are also connected respectively to the interrupt request signal line 103 for receipt of the interrupt request signal S103. The second latch circuit 202 is further connected to the interrupt process signal line 104 for delivering the interrupt process signal S104 to the central processing unit 2 through the OR gate 101. The second latch circuit 202 and the vector generation circuit 401 are connected to the interrupt acknowledge signal line 16 for receipt of the interrupt acknowledge signal S16 from the central processing unit 2. The vector generation circuit 401 is connected through the bus 31 to the bus 7. The vector generation circuit 401 is connected to the write signal line 301 for receipt of the WRITE signal transmitted from the central processing unit. The central processing unit 2 supplies the vector generation circuit 401 with the WRITE signal and concurrently supplies the vector information to the internal bus 7. The vector generation circuit 401 synchronizes with receipt of the WRITE signal from the central processing unit 2 and fetches the vector information from the internal bus 7 for storing the same. The vector information serves to specify an interrupt process having the highest priority and thus the most urgent interrupt process when the central processing unit 2 takes a hold state.

The operation of the novel single chip microcomputer 300 will subsequently be described. The control unit 200 receives the RESET signal S108 and is reset. When a hold request is generated in an external device such as a direct memory access controller, the hold request signal S12 takes a 1 level. Since at this time the interrupt request has not been generated yet, the interrupt request signal S103 is a 0 level. The first latch circuit 201 involved in the controller unit 400 receives the 0 level interrupt request signal S103 and then delivers a 1 level of the hold release signal S106 to the central processing unit 2. The AND gate 102 receives both the 1 level hold request signal S12 and the 1 level hold release signal S106 and then outputs a 1 level signal which is transmitted to the central processing unit 2. The central processing unit 2 takes a hold state. The central processing unit 2 delivers a 0 level of a hold state signal to the EXNOR gate 109. The EXNOR gate 109 receives both the 0 level hold state signal and the 1 level hold release signal S106 and then outputs a 1 level signal which is transmitted to the external interface 3 thereby each of the address bus 24, the data bus 23, the read strobe signal line 14 and the write strobe signal line 15 takes a high impedance state.

During the above hold state of the central processing unit 2, an interrupt request is generated and thus a 1 level signal of the interrupt request signal S103 appears on the interrupt request signal line 103. The first latch circuit 201 receives the 1 level signal of the interrupt request signal S103 and holds a 1 level, and then the first latch circuit 201 outputs a 0 level signal of the hold release signal S106. The AND gate 102 receives both the 1 level hold request signal S12 and the 0 level of hold release signal S106 and then outputs a 0 level signal to the central processing unit 2. The central processing unit 2 is released from the hold state and becomes operational so as to be able to receive every instruction or request signals. The central processing unit 2 delivers a 0 level of the hold state signal. The EXNOR gate 109 receives the 0 level hold state signal and the 0 level hold release signal S106 and then outputs a 1 level signal which is subsequently transmitted to the external interface 3. Thus, each of the address bus 24, the data bus 23, the read strobe signal line 14 and the write strobe signal line 15 remains a high impedance state.

The second latch circuit 202 receives the 1 level signal of the interrupt request signal S103 and holds a 1 level, and then the second latch circuit 202 outputs a 1 level signal of the interrupt process signal S104 which is transmitted to the OR gate 101, resulting in a 1 level signal outputted from the OR gate 101. The central processing unit 2 receives a 1 level interrupt request signal 17 and then delivers a 1 level interrupt acknowledge signal S16 back to the control unit 400 and the interrupt controller 1. The vector generation circuit 203 involved in the control unit 400 synchronizes with the 1 level interrupt acknowledge signal S16 and generates a vectored interrupt having the highest priority according to the vectored information which has been stored therein. As described above, the vector generation circuit 401 was connected to the write signal line 301 for receipt of the WRITE signal transmitted from the central processing unit. The central processing unit 2 has already supplied the vector generation circuit 401 with the WRITE signal and concurrently supplied the vector informations to the internal bus 7. The vector generation circuit 401 has synchronized with receipt of the WRITE signal from the central processing unit 2 and fetched the vector information from the internal bus 7 for storing the same. The vectored interrupt having the highest priority specified by the vector information stored in the vector generation circuit 401 is subsequently delivered through the bus 31 to the internal bus 7, and further transmitted through the internal bus 7 to the central processing unit 2. The central processing unit 2 fetches the vectored interrupt and subsequently executes the operation of the interrupt servicing program.

The central processing unit 2 accepts a return instruction from the interrupt servicing program at the end of the interrupt servicing program. At that time, the central processing unit 2 delivers the interrupt process complete signal S105 to the control unit 400. The control unit 400 receives the interrupt process complete signal S105 and then delivers a 1 level of the hold release signal. Since the hold request still remains and thus the 1 level signal still appears on the hold request signal line 12, the AND gate 102 outputs the 1 level signal which is subsequently fetched by the central processing unit 2 thereby the central processing unit 2 takes the hold state again.

When the hold request is eliminated, the hold request signal S12 becomes a 0 level. The AND gate 102 outputs a 0 level signal which is subsequently fetched by the central processing unit 2, resulting in that the central processing unit 2 is released from the hold state.

From the above descriptions, it is understood that the control unit 400 allows the central processing unit 2 to execute the interrupt servicing program operation, even when the central processing unit 2 takes the hold state when the interrupt request is generated. The novel single chip microcomputer 300 allows a considerable improvement in the throughput thereof, particularly as the central processing unit 2 has a high speed process function.

In the second embodiment, the interrupt having the highest priority is specified by the vector informations previously stored in the vector generation circuit 401 involved in the control circuit 400, so that a much more flexible system is achieved.

Whereas modifications of the present invention will no doubt be apparent to a person having ordinary skill in the art, to which the invention pertains, it is to be understood that the embodiments shown and described by way of illustrations are by no means intended to be considered in a limiting sense. Accordingly, it is to be intended to cover by claims all modifications which fall within the sprit and scope of the invention.

What is claimed is :
1. A single chip microcomputer comprising:
an internal communication bus for transmitting data or informations;
a random access memory connected to said internal communication bus;
a read only memory connected to said internal communication bus;
a peripheral interface connected to said internal communication bus;
a central processing unit connected to said internal communication bus, said central processing unit taking a hold state according to a hold request signal transmitted from an external device outside said microcomputer;
an interrupt controller connected to said internal communication bus, said interrupt controller receiving an interrupt request signal from an external device outside said microcomputer and then delivering an interrupt process request signal to said central processing unit; and
a control means connected to said internal communication bus wherein said control means also receives said interrupt request signal and then delivers both an interrupt process request signal and a hold release signal to said central processing unit for having said central processing unit released from said hold state and subsequently said control means synchronizes with an interrupt acknowledge signal from said central processing unit and delivers a vectored interrupt through said internal communication bus to said central processing unit so that said central processing unit executes an interrupt servicing program until said control means receives an interrupt process complete signal from said central processing unit.

2. The single chip microcomputer as claimed in claim 1, wherein said control means comprises:
first and second latch circuits connected to a reset signal line for receipt of a reset signal, said first and second latch circuits being connected to an interrupt request signal line for receipt of said interrupt request signal, said first latch circuit being connected to an interrupt process complete signal line for receipt of said interrupt process complete signal from said central processing unit, said first latch circuit being connected to a hold release signal line for delivering said hold release signal to said central processing unit, said second latch circuit being connected to an interrupt acknowledge signal line for receiving said interrupt acknowledge signal from said central processing unit, said second latch circuit being connected to an interrupt process request signal line for delivering said interrupt process request signal to said central processing unit; and
a vector generation circuit being connected to both said interrupt acknowledge signal line and said internal communication bus, said vector generation circuit generating and subsequently delivering vectored interrupts to said internal communication bus.

3. The single chip microcomputer as claimed in claim 2, wherein said vector generation circuit stores vectored information supplied from said central processing unit for specifying an interrupt having the highest priority according to said vector informations.

4. The single chip microcomputer as claimed in claim 2 wherein said control means is further connected to said central processing unit by a write signal line for receipt of a write signal from said central processing unit, said write signal line being connected to said vector generation circuit within said control means to allow said vector generation circuit to synchronize with said write signal when fetching interrupt vector information from said internal communication bus.

5. The single chip microcomputer as claimed in claim 1, wherein said central processing unit is connected to a hold request signal line for receipt of said hold request signal, said central processing unit being connected through a hold acknowledge signal line to said external interface for delivering a hold acknowledge signal to to said external interface.

6. The single chip microcomputer as claimed in claim 5, wherein said external interface is connected to a data bus, an address bus, a read strobe signal line and a write strobe signal line, said external interface receiving said hold request signal from said central processing unit and then taking a high impedance state.

* * * * *